United States Patent [19]

Krabbenhoft

[11] Patent Number: 4,579,905

[45] Date of Patent: Apr. 1, 1986

[54] GRAFTLINKED POLYMERS AND PROCESS FOR MAKING

[75] Inventor: Herman O. Krabbenhoft, Evansville, Ind.

[73] Assignee: General Electric Company, Mt. Vernon, Ind.

[21] Appl. No.: 523,187

[22] Filed: Aug. 15, 1983

[51] Int. Cl.[4] .............................................. C08L 51/08
[52] U.S. Cl. ...................................... 525/63; 525/67; 525/69; 525/88; 525/132; 525/146; 525/148; 525/165; 525/178; 525/391; 525/394; 525/397; 525/433
[58] Field of Search ..................... 525/146, 67, 69, 92, 525/132, 165, 178, 468, 906, 394, 461, 535, 902, 63, 88, 391, 426, 445, 148, 397, 433

[56] References Cited

U.S. PATENT DOCUMENTS

| | | | |
|---|---|---|---|
| 3,058,957 | 10/1962 | Breslow | 260/79.3 |
| 3,137,745 | 6/1964 | Johnstone | 264/54 |
| 3,203,936 | 8/1965 | Breslow et al. | 260/79.3 |
| 3,203,937 | 8/1965 | Breslow et al. | 260/79.3 |
| 3,341,481 | 9/1967 | Palmer | 260/2.5 |
| 3,583,939 | 6/1971 | Bostick et al. | 525/461 |
| 4,256,853 | 3/1981 | Naylor et al. | 525/92 |
| 4,417,031 | 11/1983 | Aharoni et al. | 525/425 |

FOREIGN PATENT DOCUMENTS 41750 2/1964 Japan.

Primary Examiner—Theodore E. Pertilla
Attorney, Agent, or Firm—Martin B. Barancik

[57] ABSTRACT

A composition comprising an intimate thermoplastic admixture of at least two structurally dissimilar organic polymers, a delamination inhibiting effective amount of the first organic polymer covalent bond graft linked to the second organic polymer through a multifunctional graft linking agent of the insertion, electron deficient type the new admixtures are useful for the usual applications associated with the admixture properties.

68 Claims, No Drawings

GRAFTLINKED POLYMERS AND PROCESS FOR MAKING

BACKGROUND OF THE INVENTION

Polymeric materials are used in numerous applications in modern technology. In order to be useful, the polymers are molded, extruded or formed into various shapes and shaped articles. For the polymer to take the shape of the formed article, the physical state of the polymer must be sufficiently pliable so that it may be readily worked into the desired shape. This pliability or flow is usually achieved by melting the polymer and forcing the polymer into the desired shape with a specific tool such as an extruder, an injection mold, compression mold, blow mold and the like.

During this forming or shaping process, the polymer is subjected to various extremes of temperature, pressure and the like as well as other unknown factors. When a single polymer is employed, the shaped article generally only has a minimum of molding problems, usually due to the specific properties of the polymer. However when an admixture of two or more different polymers is formed into a shaped article, problems beyond those caused by the specific properties of each individual polymer can occur. Unless the polymers are completely soluble in each other at the temperature the shaped article is formed, or to which it is cooled, partitioning of the nonsoluble polymers into domains can occur. There may be domains of admixed polymers having a different weight percent composition of component polymers than the remainder of the admixed polymers in the shaped article. Such differences in composition occur with some frequency at the surface of the shaped article. Although the phenomonon is not completely understood it appears that molecular weight and melt viscosity are contributing factors to the partitioning of constituent polymers of blends to the surface of a shaped article during its formation under elevated temperature. A shaped article which has this laminar structure or "laminate" is oftentimes unaffected by its presence as measured by its property profile.

However, many times the laminate does not adhere well to the remainder of the shaped article and in time undesirable changes occur. These changes, generally referred to as "delamination", include but are not limited to the flaking, peeling, or cracking of the surface skin after a period of time. When delamination occurs the appearance of the shaped article obviously suffers. Appearance is of great significance in articles such as housings and painted pieces. Moreover the delamination exposes the interior portion of the shaped article to the presence of various chemicals and environmental effects which it may not withstand. It is quite apparent that significant delamination can render a shaped article unfit for its intended use. This delamination can be observed in shaped articles as small as ⅛ inch pellets formed by a knife cutting an extrudate.

SUMMARY OF THE INVENTION

It has now been found that delamination of a shaped article subject to delamination, said shaped article comprising an intimate admixture of polymers, can be inhibited by grafting through a covalent bond linkage a polymer of the admixture to a second, structurally different polymer of the admixture, the two polymers not being totally soluble in each other through the use of a multifunctional grafting agent. The functionality of the grafting agent forms a covalent bond with at least two structurally different polymers of the admixture.

With the use of a family of multifunctional grafting agents it has surprisingly been discovered that the grafting reaction can be conveniently carried out at relatively low reaction temperatures in a commercial article shaping machine such as an extruder or an injection molder. No organic solvent such as is commonly employed in film casting is necessary for the reaction to occur. Contact in the melt or plastic state is generally sufficient. The percent of grafted material present after reaction is directly related to the quantity of multifunctional grafting agent present, the residence contact time between the multifunctional grafting agents, the particular polymers to be graft linked and the reaction temperature.

After a certain minimum amount of grafting, the tested shaped articles prepared from specific polymer admixtures having a tendency to delaminate experience less delamination. In many of the tested grafted admixtures, there was a substantial to almost complete retention of tested properties in comparison to the same non-grafted admixture. It is important to note that the grafted admixture is thermoplastic, that is capable of molding and is insufficiently insoluble and/or infusible to be used in applications wherein a thermoset resin is required. The prior art disclosing the use of polysulfonazide for joining polymers is limited to the production of a polymeric network which is sufficiently insoluble and infusible that a thermoset or a vulcanizate is formed. When two differing polymers are reacted with a polysulfonazide, a covulcanizate is reported as being formed. Not only is the grafted admixture of the invention sufficiently thermoplastic for injection molding operations but this admixture can be "let down", i.e. added to (a) other nongraft linked polymers of the same type which have been graft linked, (b) non-graft linked polymers of a different type than have been graft linked and (c) graft linked polymers of a different type that have been graft linked and still obtain an admixture which is sufficiently thermoplastic as well as compatible that it can be molded and, in particular, injection molded. A non-limiting example of the admixture of (a) above is the addition of polycarbonate grafted to Kraton G, a partially hydrogenated butadiene styrene polymer obtained from Shell, to polycarbonate alone, to Kraton G alone or to an admixture of nongrafted polycarbonate and Kraton G. A non-limiting example of (b) above is the addition of polycarbonate grafted to Kraton-G to non-grafted ethylene ethyl acrylate or non-grafted ethylene ethyl acrylate and polyethylene. A non-limiting example of (c) above is the addition of polycarbonate grafted to Kraton G to ethylene ethylacrylate grafted to polyethylene. Various quantities of these grafted admixtures can be "let down" as above in (a), (b) and (c) while still maintaining the thermoplasticity of the new admixture as well as its compatibility. These new "let down" formulations of the invention also have inhibited delamination in comparison with compositions having no grafted materials therein.

Thus, in accordance with the invention there is a composition comprising an intimate thermoplastic admixture of at least two structurally dissimilar organic polymers (the two polymers not being totally soluble in each other), a delamination inhibiting effective amount of the first organic polymer grafted with a covalent bond to the second, structurally dissimilar, organic polymer through a multifunctional graft linking agent of the insertion, electron deficient type.

Another aspect of the invention is a process for preparing an intimate thermoplastic admixture of at least two structurally dissimilar organic polymers, which comprises graft linking one organic polymer to a second structurally dissimilar organic polymer with a delamination inhibiting effective amount of a multifunctional grafting agent of the insertion, electron deficient type.

The scope of the invention is to such an extent that more than two polymers can be graft linked at the same time. For example, a polycarbonate is graft linked to an ethylene propylene diene rubber which is graft linked to a polystyrene at the same time.

DETAILED DESCRIPTION OF THE INVENTION

The composition which has a tendency to delaminate is comprised of at least two structurally dissimilar organic polymers. The polymers should be so structurally dissimilar that the two polymers should not be totally soluble in each other under the conditions which the admixture is prepared and/or at room temperature. Examples of thermoplastic polymers useful in accordance with this invention include polyolefins such as polyethylene, polypropylene, polyisobutylene, polyhexene, linear low density polyethylene and in general polyolefins derived from monomers having from two to about ten carbon atoms; ethylene propylene diene (EPDM) polymers, for example those wherein the diene is butadiene, polyesters such as those having all aliphatic units such as adipates, azelates, and succinates, a mixture of aliphatic and aromatic units such as polyalkylenephthalates, for example, polyethylene terephthalate, polybutylene terephthalate, polypropylene isophthalate and the like as well as those esters which are completely aromatic, sometimes known as polyarylates, for example polyester derived from bisphenols such as 2,2-bis(4-hydroxyphenyl)propane (bisphenol-A) and various diacids such as isophthalic acid, terephthalic acid, and naphthenic carboxylic acids. Aromatic polycarbonates are also useful polymers and are those derived from bisphenol-A as well as those with other groups between the phenols to be further elaborated upon. Aromatic copolyestercarbonates, for example, those polymers disclosed in Goldberg U.S. Pat. No. 3,169,121 incorporated by reference and having carbonate as well as ester linkages present in the backbone of the polymer may also be employed.

Other thermoplastic families which may be employed with facility are the polyphenylene oxides, polyetherimide, polysulfones, polyethersulfones, styrenics, polyamides, polysulfides, polyurethanes, polyvinylhalides and rubbery type polymers such as butadienes, acrylates and alkacrylates. Aromatic groups in these polymers are preferred.

Copolymers of any of these polymers disclosed in this specification are also useful in the composition. Non limiting examples of these copolymers include ethylene-butylene copolymer; polyalkylene terephthalate wherein the alkylene units are both ethylene and butylene and/or a cycloalkylene such as cyclohexane dimethanol; polycarbonate derived from bisphenol A and tetrabromobisphenol A; copolyestercarbonates having both iso, and terephthalate units; polyarylates having both iso, and terephthalate units; polyphenylene oxides having a 2,6 dimethyl phenol monomer specifically poly(2,6-dimethyl-1,4-phenylene oxide) and other phenolic monomers; various comonomers with butadiene, for example a styrene; and the like.

The styrenics include any aromatic substituted vinyl such as polystyrene and α-alkyl, particularly poly α-methylstyrene. The phenyl ring may be alkyl substituted, for example, poly p-methylstyrene. Of particular interest are copolymers of the styrenics in various diblock, triblock and radial block forms and in the coupled and graft linked forms. For example illustrative of the last category are the polymers styrene acrylonitrile and acrylonitrile butadiene styrene, oftentimes known as ABS. Frequently combined with styrene as a comonomer is a potentially rubbery compound such as butadiene so as to prepare a di or triblock of butadiene styrene and other complex materials for example butadiene-styrene radial block copolymer system such as KR03 of Phillips, and selectively hydrogenated butadiene-styrene system such as the hydrogenated styrene-butadiene-styrene triblock polymer obtained from Shell as Kraton G, for example Kraton G 1650 and 1651. Other styrene containing copolymers which can be employed include styrene maleic anhydride and butadiene containing styrene maleic anhydride.

By structurally dissimilar organic polymers is meant that the polymers are actually different in structure, for example, a polycarbonate and a butadiene styrene, which brings about a lack of complete solubility in each other at the concentrations employed and the temperature at which the admixture takes place or at room temperature. Generally it is preferred to have at least one aromatic containing polymer, preferably a polycarbonate in the blend. Also preferred is a polyphenylene oxide, poly-(2,6-dimethyl-1,4-phenylene oxide).

The multifunctional graft linking agent employed is any compound with a minimum of two functional groups, each of which can react with and form a covalent bond with organic polymers which are structurally dissimilar from each other. Of course it is preferable to leave the functional groups of the polymer, if present, unaffected since frequently the functional groups of a polymer are responsible for a significant portion of the desired properties. Although not always achievable it is preferable to inhibit delamination and concurrently maintain as many of the desirable properties of the admixture to as high a degree as possible. In order to potentially maximize these desirable goals, the multifunctional graft linking agent is an organic molecule which preferably reacts with the carbon atoms of the admixture organic polymers. These agents are known generally as "insertion" type reactants capable of rapid covalent bonding with a carbon atom by inserting itself between a carbon atom and a hydrogen atom or a second carbon atom. These agents which are electron deficient in nature seek out electron rich centers for the insertion type reaction. Illustrative of examples of this type of agent include arynes, carbenes, and nitrenes, see Gilchrist and Rees, Carbenes Nitrenes and Arynes, 1969, incorporated by reference, for the general chemistry relating to this family of compounds. Because of their extremely reactive nature, these active agents are generally prepared in situ with the polymer admixture with which they will react.

Of the insertion type multifunctional agents which can be useful in accordance with this invention, the nitrenes are preferred. The precursor azide processes well and provides a single mole of nonreactive nitrogen during the formation of each nitrene. Sulfonyl azides are particularly preferred because of their increased stability per se, and the insertion product derived therefrom, apparently a sulfonamide, is relatively unreactive and quite compatible with most polymeric systems. Connecting the azides, preferably the sulfonyl azides, is an organic group, i.e. an aromatic group(s) or aliphatic group(s) which can be represented by the formula $$R(SO_2N_3)_x \qquad \text{Formula I}$$

wherein R is an organic group and x is at least 2 and preferably no more than about 10.

The aliphatic groups are alkylene or alkylidene, cycloalkylene or cycloalkylidene, or substituted moieties thereof, for example such substituents include aromatic groups such as phenyl or heteroatoms such as the halo substituents, for example fluoro, chloro and bromo, preferably bromo and chloro. Preferred aliphatic groups include alkylene of one to about twelve carbon atoms, inclusive, either normal or branched, for example isopropenyl and 2,2-dimethylbutenyl, alkylidene of from two to about twelve carbon atoms, including normal or branched, for example isopropylidene; cycloalkylene of from four to about eight carbon atoms, inclusive, for example cyclopentyl and cyclohexyl; and cycloalkylidene of from about four to about eight carbon atoms, inclusive, for example cyclohexylidene.

The aromatic group(s) which connect the sulfonyl azide groups and are generally preferable over aliphatic group(s) include phenylene, naphthylene, anthralene, biphenyl and the named aromatic groups substituted with one to three substituents on each ring, the substituents essentially unreactive under the condition of the chemical modification. Examples of such groups include hydrocarbyl such as alkyl, cycloalkyl, aromatic, aralkyl, alkaryl and the like. The alkyl are generally from one to six carbon atoms, inclusive; cycloalkyl from five to seven carbon atoms, inclusive; aromatic of six to ten carbon atoms, inclusive; aralkyl of seven to nine carbon atoms, inclusive; and alkaryl of seven to twelve carbon atoms, inclusive. Other examples of unreactive groups include 0-hydrocarbyl. The biphenyl can be joined together by a mere covalent bond between carbon atoms or may have various groups joining the biphenyl groups as shown below:

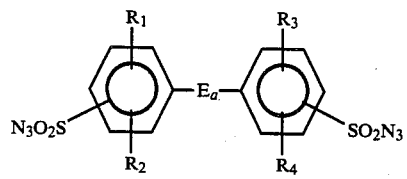

Formula II wherein a is 0 or 1 and E is selected from alkylene, cycloalkylene, alkylidene, cycloalkylidene; a sulfur containing linkage such as sulfide, sulfoxide, or sulfone; an ether linkage; a carbonyl group; a tertiary nitrogen group; or a silicon containing linkage such as silane or siloxy. Alkylene and alkylidene are generally from one to about eight carbon atoms exclusive; cycloalkylene and cycloalkylidene are generally from about five to about eight carbon atoms, inclusive. Where E is an alkylidene or an alkylene it may consist of two or more alkylene and/or alkylidene groups, as previously disclosed, connected by a non-alkylene or non-alkylidene group such as an aromatic group, a tertiary amino group, an ether linkage, a silicon containing linkage, a carbonyl group or by a sulfur containing group such as a sulfide, sulfoxide or sulfone.

$R_1$, $R_2$, $R_3$ and $R_4$ are the same or different and are selected from the group consisting of hydrogen, alkyl of one to six carbon atoms, inclusive, chloro or bromo.

Preferable multifunctional agents are the sulfonylazides of Formula I, particularly those wherein $R_1$, $R_2$, $R_3$ and $R_4$ are hydrogen, a is 0 or 1 and where a is 1, E is sulfur, sulfinyl, sulfonyl or oxygen.

The amount of multifunctional graft linking agent, preferably aromatic polysulfonazide, which is employed is a delaminating inhibiting effective amount. Generally it is preferable to use a range of from about 0.01 to about 2.0 weight percent, based on total polymer in the grafting reaction. Below this range, it is relatively difficult to inhibit the delamination process. Above this range, the reaction tends to become more non-selective as sometimes shown by the formation of color forming by-products. A preferred range is from about 0.1 to about 1.5 weight percent. Generally, above 0.5 weight percent provides adequate grafting. Although these are general ranges, a specific reaction may require somewhat more or somewhat less multifunctional graft linking agent. Elements affecting the quantity of agent include the specific polymer's ease or difficulty of grafting, the particular multifunctional graft linking agent employed and the application for which the admixture is intended. The totality of reaction condition and parameters including quantity of graft linking agent, temperature and time of reaction should be such that the resulting graft linked admixture should be thermoplastic as opposed to thermoset. Generally, the reaction can be performed in less than two minutes.

The reaction between the multifunctional graft linking agent and the polymer is carried out under appropriate conditions which bring about a smooth and relatively fast reaction between dissimilar organic polymers and the multifunctional graft linking agents while maintaining as many of the admixture's properties to a great extent. A complete reaction between the two dissimilar polymers is not necessary and oftentimes not achieved. It is readily apparent that the graft linking agent is joining molecules of the same polymer as well as the dissimilar polymers. When using the aromatic polysulfonazide, for example, the polymers to be grafted and the aromatic polysulfonazide are mixed together in the dry state in an ordinary mixer such as a paint shaker or comparable apparatus of appropriate size and then extruded. During the extrusion operation, the reaction between the multifunctional graft linking agents and the dissimiliar polymers occurs. It should be noted that it is apparently not the aromatic polysulfonazide which actually reacts with the dissimilar polymers. Rather the azide moiety decomposes and loses a molecule of nitrogen under elevated temperature, thereby forming in situ the nitrene. The nitrene must be formed in situ because its electron deficiency makes it highly reactive. It is therefore thought that the aromatic polysulfonyl nitrene reacts with the dissimilar polymers forming a covalent bond. Generally, this bond appears to be a sulfonamide bond. Below is a schematic diagram of the process that is believed to take place.

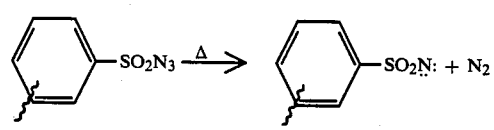

-continued

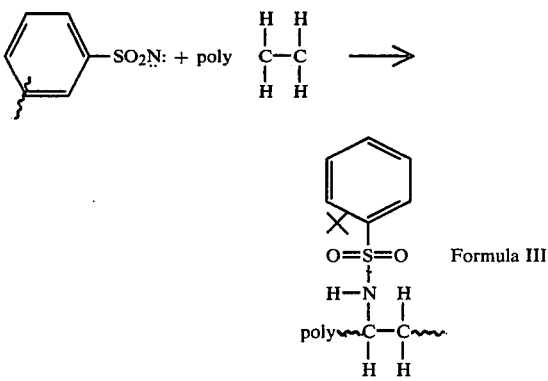

Although it is believed that the reaction takes place by this mechanism we do not wish to be held to any theory which attempts to explain the action of the polysulfonazide as a graft linker or any other precursor which may form electron deficient, insertion type compounds.

In the extruder, the polymers and the aromatic polysulfonazide are at a temperature wherein the polymers are at least in a sufficiently plastic pliable state that they can be readily worked and the aromatic polysulfonazide decomposes.

The temperature at which the reaction occurs appears to affect the yield of the grafted polymer. Generally, the higher the temperature, the poorer the yield of grafted polymers. This observation is contrary to the usual temperature effect and is not fully understood.

It should be noted that the reaction parameters of time, temperature and quantity of aromatic polysulfonazide should be varied according to the specific polymers to be grafted. Certain polymers require higher temperatures to place them in a sufficiently plastic, fluid state for working in a reactor. For example, aromatic polycarbonate requires a substantially higher temperature than polyolefins before sufficiently fluid in an extruder. Still further, the rate of reaction of the nitrene with the polymer is at least somewhat dependent upon the structure of the polymer. An aliphatic carbon-carbon double bond is more reactive than an aromatic carbon-carbon bond which is more reactive than a saturated carbon-carbon bond or a carbon-hydrogen bond. A more reactive structure generally requires a lower temperature and/or a smaller quantity of aromatic polysulfonylazide. When one polymer is substantially more reactive than a dissimilar polymer, it is generally preferred to utilize larger quantities of the less reactive polymer in comparison to the more reactive polymer.

It has also been found that it is preferable to carry out the grafting reaction in the essential absence of the usual compounds necessary to stabilize the polymers.

After the grafting reaction is over, an admixture of thermoplastic graft linked dissimilar polymers is obtained. Also present in this admixture may be found graft linked polymers of the same type, for example polystyrene graft linked to polystyrene. If the reaction has not gone to completion, there will also be certain percentages of each polymer which is not graft linked to any polymer. It is this admixture or any portion thereof when made into a shaped article which will experience less delamination than a non-graft linked admixture, assuming the minimum amount of graft linking. It is also noted that this admixture or portion thereof can be "let down" that is admixed with various polymers as previously mentioned, that is (a) other non-graft linked polymers of the same type which have been graft linked, (b) non-graft linked polymers of a different type than have been graft linked and (c) graft linked polymers of a different type that have been graft linked and still obtain an admixture which is sufficiently thermoplastic that it can be molded and, in particular, injection molded.

The preferred organic polymer is aromatic polycarbonate, preferably prepared from the dihydric phenol, 2,2'-bis(4-hydroxyphenyl)propane. Other bisphenols which can be employed are: bis(4-hydroxyphenyl)methane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane; dihydric phenyl ethers, for example, bis(4-hydroxyphenyl)ether, bis(3,5-dichloro-4-hydroxyphenyl)ether; dihydroxydiphenyls, for example, p,p'-dihydroxyphenyl, 3,3'-dichloro-4,4'-dihydroxydiphenyl; dihydroxyarylsul-phones, for example, bis(4-hydroxyphenyl)-sulphone, bis(3,5-dimethyl-4-hydroxyphenyl)sulphone; dihydroxy benzenes, resorcinol, hydroquinone; halogen- and alkylsubstituted dihydroxybenzenes, for example, 1,4-dihydroxy-2,5-dichlorobenzene, 1,4-dihydroxy-3-methyl benzene and dihydroxydiphenylsulphoxides, for example, bis(4-hydroxyphenyl) sulphonoxide, bis(3,5-dibromo-4-hydroxyphenyl)sulphoxide. A variety of other dihydric phenols may also be used for the preparation of the carbonate polymers. These are stated, for example, in U.S. Pat. Nos. 2,999,835; 3,028,365 and 3,153,008.

The dissimilar polymer to which the aromatic polycarbonate is grafted is frequently a polyolefin or olefin containing copolymer or a styrene containing polymer or copolymer. The molded parts of admixtures containing a dissimilar polymer grafted to polycarbonate have uniformly possessed less surface gloss than the like composition admixture without grafted aromatic polycarbonate. This phenomonon also occurs when the aromatic polycarbonate is not one of the dissimilar polymers graft linked to each other. For example, a grafted admixture of KR03 and acrylonitrile butadienestyrene (Blendex 336) admixed with nongrafted aromatic polycarbonate results in a molded part having less surface gloss than an admixture of aromatic polycarbonate, Blendex 336 and KR03 without grafting.

The various stabilizers, fillers, additives, impact modifiers and the like normally associated with the polymers in the composition may also be present in the compositions. For example with respect to aromatic polycarbonate, thermal stabilizers such as phosphite and hindered phenols as well as hydrolytic stabilizers such as epoxides may also be present. Fillers such as glass or reinforcing glass fibers can also be present. Ultra violet stabilizers such as the benzophenones and benzotriazoles are readily employed as well as flame retarding agents such as aromatic sulfonic acid salts or halogenated aromatic sulfonic acid salts. Although blowing agents such as azobis(formamide), diazoaminobenzene and the like can be used concurrently in the reaction and the residue thereof being present in the grafted admixture, it is preferred to carry out the reaction in the essential absence of additional blowing agent.

Below are various control experiments and examples of the invention. These examples are intended to illustrate rather than limit the generic concept of the invention. Unless otherwise stated, as used in the ensuing examples the aromatic polycarbonate is made from bisphenol A and has an intrinsic viscosity of about 0.46–0.49 dl/g in methylene chloride at 25° C. The grafting with the aromatic polysulfonazide was carried out in the absence of stabilizers in a Sterling single screw extruder at the indicated temperature and the part injection molded at about 285° C. The percent grafted material was assessed by exhaustive extraction with methylene chloride of usually 25 grams of the grafted material (and the ungrafted control material); concentration to dryness and analysis of the entire concentrate by infra red spectroscopy for the amount of polycarbonate present. The difference in percent soluble polycarbonate between the control and the sample represents the amount of polycarbonate which has been grafted. Notched Izod and Double Gate Impact tests of the molded parts were carried out according to ASTM D-256.

phenyl sulfone, abbreviated DPSBSA, on percent grafting of polycarbonate was measured. The blend admixture was extruded at about 155° C.

TABLE 2

| WT. PERCENT DPSBSA | % GRAFTING |
|---|---|
| 1.0 | 8.5 |
| 1.4 | 13.4 |
| 1.9 | 19.6 |

As more grafting agent is employed, greater grafting occurs.

EXAMPLE 3

The procedure of Example 1 was followed except that in addition to BPBSA, di-(4-azidosulfonyl)-phenyl ether, (DPEBSA) and di-(3-azidosulfonyl)phenyl ether (DPSBSA) were also employed as grafting agents. The extrusion temperature was approximately 177° C. The grafting results are shown below in Table 3.

TABLE 3

| GRAFTING AGENT AMOUNT (%) | INITIAL WEIGHT OF POLYCARBONATE IN EXTRACTION SAMPLE (g) | WEIGHT OF CONCENTRATED EXTRACT (g) | PERCENT POLY-CARBONATE IN CONCENTRATED EXTRACT (%) | AMOUNT OF POLY-CARBONATE GRAFTED (g) | (%) |
|---|---|---|---|---|---|
| BPBSA (1.00) | 5.00 | 4.85 | 54.4 | 2.36 | 47.2 |
| DPEBSA (1.05) | 8.33 | 6.46 | 90.2 | 2.50 | 30.0 |
| DPSBSA (1.18) | 8.33 | 6.36 | 90.6 | 2.57 | 30.9 |

EXAMPLE 1

Bisphenol A polycarbonate and Kraton G 1651, a selectively hydrogenated polystyrene-polybutadienepolystyrene triblock copolymer obtained from Shell Chemical Company were dryblended together in a paint shaker at a 1:2 weight ratio, respectively, with 1 weight percent, based on the total amount of polycarbonate and Kraton G 1651, of 4,4'-biphenyldisulfonyl azide, hereafter known as BPBSA, and extruded with a one minute residence time at the temperatures indicated in Table 1. The extrudates were chopped into pellets of approximately 5 mm length, which were then ground by means of a Thomas-Wiley Model 4 laboratory mill equipped with a 4 mm screen to give particles with diameters generally smaller than 1 mm. The results are collected in Table 1.

From the above data it is clear that various polysulfonazides provide good grafting, but the structurally simplest polysulfonazide BPBSA, no heteroatomic group separating the two phenyl rings, provided the greatest degree of grafting.

EXAMPLE 4

Following the procedure of Example 3 but employing 0.05 weight percent of a phosphite and 0.10 weight percent of a hindered phenol, in addition to the BPBSA, the 1:2 polycarbonate/Kraton G 1651 mixture was extruded at about 205° C. to provide material which upon analysis revealed that only 12% of the polycarbonate was grafted.

EXAMPLE 5

The ground grafted admixture prepared at 177°–182°

TABLE 1

| EXTRUSION TEMPERATURE (°C.) | INITIAL WEIGHT OF POLYCARBONATE IN EXTRACTION SAMPLE (g) | WEIGHT OF CONCENTRATED EXTRACT (g) | PERCENT POLY-CARBONATE IN CONCENTRATED EXTRACT (%) | AMOUNT OF POLY-CARBONATE GRAFTED (g) | (%) |
|---|---|---|---|---|---|
| 177–182 | 8.33 | 5.02 | 87.8 | 3.92 | 47.1 |
| 200–213 | 5.00 | 4.34 | 86.5 | 1.25 | 25.0 |
| 232–240 | 5.00 | 4.92 | 87.3 | 0.70 | 14.0 |

The temperature has a very significant effect on the degree of grafting—the lower the temperature, the greater the degree of grafting. Thus, it is necessary to blend polycarbonate or other high temperature thermoplastics with the resin(s) to be grafted in such a manner to render the final composition suitable for extrusion at a temperature conducive to a high degree of grafting.

EXAMPLE 2

Following the procedure of Example 1 but utilizing a 2:1 weight blend of polycarbonate:Kraton G 1651 the effect of increased quantities of di-(3-azidosulfonyl)

C. from Example 1 was mixed with additional polycarbonate and an ethylene ethyl acrylate copolymer (DPD 6169 obtained from Union Carbide Co.) to give a final weight composition of 82.5% polycarbonate, 7.5% Kraton G 1651, and 10.0% DPD 6169 (grafted sample). An analogous material was prepared from a mixture of polycarbonate and Kraton G 1651 in a 1:2 weight ratio (which had been obtained as described in Example 1 at 177°–182° C. except that the BPBSA had been omitted) plus additional polycarbonate and the DPD 6169 ethylene ethyl acrylate copolymer (control). Each of these compositions (the sample with the grafted admixture and the control with the ungrafted admixture) was further mixed with 0.03 wt. % of a phosphite and 0.03 wt. % of a hindered phenol, mixed in a paint shaker and extruded at 288° C. The extrudates were then chopped into pellets, dried at 121° C. and molded into standard test parts at 274° C. The test results are summarized in Table 4.

TABLE 4

| COMPOSITION | NOTCHED IZOD (ft. lbs/in) | | DOUBLE GATE IMPACT(ft/lbs) | HEAT DISTORTION TEMPERATURE |
| --- | --- | --- | --- | --- |
| | 3.2 mm | 6.4 mm | 3.2 mm | °C. |
| Grafted | 13.3 | 7.1 | 4.1 | 132.8 |
| Control | 15.3 | 9.5 | 2.1 | 135.1 |

Delamination—This was ascertained by bending a molded step chip (nominally 50×75 mm with one end, i.e. a 25×50 mm section, being 1.6 mm thick and the other, i.e. a 50×50 mm section, being 3.2 mm) along the step and determining if a skin or layer separates from the bulk of the chip.

The grafted materials each outperformed their non-grafted controls. It was far easier to peel the skin from the control than the grafted composition. It was more difficult to create a "skin leader" with the grafted material than with the control.

The notched Izod impact values are only slightly reduced. Heat distortion temperature is also only slightly reduced. In the case of double gate impact resistance, the sample outpreformed the control significantly, although the value was still relatively low.

In addition, when the 3.2 mm Izod bars were soaked in gasoline at 3400 psi strain for 2 hours, then allowed to dry for 24 hours at room temperature, notched and impacted, it was found that neither the grafted sample nor the control exhibited any loss in impact resistance.

It was observed that the test specimens containing the grafted admixture of polycarbonate and Kraton G 1651 were significantly less glossy than the test parts based on the ungrafted admixture of polycarbonate and Kraton G 1651. It is frequently desirable to have finished plastic articles with low gloss.

EXAMPLE 6

The ground grafted admixture prepared in Example 4 was blended with polycarbonate and ethylene ethyl acrylate as described in Example 5 to give a final weight composition of 85% polycarbonate, 10% Kraton G 1651, and 5% ethylene ethyl acrylate copolymer (DPD-6169). Likewise, an otherwise identical control mixture based on an ungrafted admixture of polycarbonate and Kraton G 1651 was prepared. These two mixtures were then blended with 0.03% by weight each of a phosphite and a hindered phenol, mixed in a paint shaker, and extruded at 288° C., chopped and molded at 288° C. into discs measuring nominally 305 mm in diameter by 1.6 mm thick and having on one side a raised section at the center measuring about 35 mm in diameter by 1.6 mm thick.

For the control discs delamination occurred readily, if not spontaneously, around the center step. In addition, upon bending the control disc, delamination occurred quite easily along the bend line. However, the sample disc showed no delamination or tendency to delaminate at the center step or upon repeated bending.

A portion of the control and test materials was molded at 288° C. into Izod bars for impact resistance measurement. The results are summarized in Table 5.

TABLE 5

| MATERIAL | NOTCHED IZOD (3.2 mm) (ft. lbs/in) | DOUBLE GATE (3.2 mm) IMPACT (ft.lbs) |
| --- | --- | --- |
| Grafted Sample | 11.6 | 9.3 |
| Control | 13.4 | 12.4 |

The impact values are slightly reduced when grafted components are employed in the composition.

All molded parts having grafted components therein had substantially less surface gloss than molded parts prepared from the control.

EXAMPLE 7

Compositions each having 500 grams of polycarbonate, 0.75 wt. percent of a phosphite and 1.5 wt. % of a hindered phenol were prepared by blending with each of the additional components shown below. These blends were then extruded at approximately 218° C. as described in Example 1. Analysis for degree of grafting is reported in Table 7.

TABLE 6

| MATERIAL | LINEAR LOW DENSITY POLY-ETHYLENE (g) | | DPD 6169 (g) | EXXON POLY-PROPYLENE 1012 (g) | BPBSA (g) |
| --- | --- | --- | --- | --- | --- |
| | LPX-15 | LPX-1 | | | |
| 6-1 | 500 | — | 500 | — | 18.2 |
| 6-2 | — | 1000 | — | — | 9.1 |
| 6-3 | — | — | — | 1000 | 9.1 |

LPX-15 and LPX-1 are obtained from Exxon.

DPD-6169 is an ethylene ethyl acrylate copolymer with a weight ratio of about 4.5:1 respectively.

Portions of the materials described above were then mixed with additional polycarbonate, and additional phosphite and hindered phenol stabilizers, extruded at approximately 260° C., chopped, dried at 121° C. and molded at 274° C. into standard test parts for evaluation. Control samples were prepared employing the same quantities of components but without grafting agent added. The additional phosphite and hindered phenol added was 0.05 wt. percent and 0.10 wt. percent of the 1500 g. formulations of Table 7. The test results are summarized in Table 7.

TABLE 7

| MATERIAL CODE | GRAFTED ADMIXTURE | | | POLYCARBONATE AMOUNT (g) | NOTCHED IZOD IMPACT (3.2 mm) ft. lbs/in. | | DOUBLE GATE IMPACT (3.2 mm) ft. lbs/in. | |
|---|---|---|---|---|---|---|---|---|
| | CODE | % GRAFTED | AMOUNT (g) | | SAMPLE | CONTROL | SAMPLE | CONTROL |
| 7-1 | 6-1 | 15.0 | 360 | 1140 | 7.7 | 17.2 | 1.3 | 2.1 |
| 7-2 | 6-1 | 15.0 | 270 | 1230 | 9.6 | 16.5 | 2.0 | 4.1 |
| 7-3 | 6-1 | 15.0 | 180 | 1320 | 11.6 | 15.5 | 2.3 | 9.3 |
| 7-4 | 6-2 | 8.5 | 360 | 1140 | 6.7 | 12.6 | 1.7 | 1.7 |
| 7-5 | 6-2 | 8.5 | 270 | 1230 | 8.0 | 13.2 | 2.0 | 2.2 |
| 7-6 | 6-2 | 8.5 | 180 | 1320 | 10.5 | 15.1 | 3.2 | 2.8 |
| 7-7 | 6-3 | 9.6 | 360 | 1140 | 4.8 | 8.0 | 0.8 | 1.7 |
| 7-8 | 6-3 | 9.6 | 270 | 1230 | 6.7 | 10.1 | 1.1 | 2.4 |
| 7-9 | 6-3 | 9.6 | 180 | 1320 | 11.1 | 14.4 | 1.6 | 3.8 |

As shown in Table 7, the compositions having the grafted components had reduced impact values in comparison to the non-grafted control compositions. However, with respect to delamination and following the test procedures of Example 5, the sample containing the grafted components clearly outperformed the control sample. Serious delamination occurred after only a few bends with the control step chip while such delamination was significantly inhibited in the step chip having the grafted components.

All parts having grafted components therein had substantially lower surface gloss than the control parts.

EXAMPLE 8

Following the procedure of Example 1, 1000 g of high impact polystyrene 834 obtained from Foster Grant Co. was mixed with 500 grams of polycarbonate. One wt. percent of BPBSA is added and the admixture extruded at approximately 177° C. The degree of grafting was determined to be 20% in accordance with the procedure of Example 1. This is labeled "Masterbatch Grafted". The same procedure was followed utilizing the same components and quantities except that the BPBSA was omitted. This is labeled "Masterbatch Control".

To 170 g. of each of the prepared Masterbatches was added 1180 g. of polycarbonate and 150 gms. of either low density polyethylene (LPX-15) or ethylene ethylacrylate (DPD-6169). Each composition also contained 0.03 wt. percent of each of a phosphite and a hindered phenol. Each composition was extruded at a temperature of about 260° C. and parts molded for testing for notched Izod, Double Gate and delamination. Below are the results.

TABLE 8

| MASTERBATCH | LPX-15 (g) | DPD-6169 (g) | NI (3.2 mm) (ft. lbs/in) | DG (3.2 mm) (ft. lbs/ins) |
|---|---|---|---|---|
| Control | 150 | — | 11.7 | 4.4 |
| Grafted | 150 | — | 5.4 | 2.1 |
| Control | — | 150 | 17.0 | 3.8 |
| Grafted | — | 150 | 4.7 | 2.6 |

Although both the grafted notched Izod and Double Gate values were significantly reduced from control values, the test procedure for delamination, Example 5, showed that the admixture having the grafted components was far more difficult to delaminate than the control admixture without grafting in the same manner as Example 5.

The surface gloss of the molded parts having grafted components therein was substantially less than the surface gloss of the molded control parts.

EXAMPLE 9

Other sets of dissimilar polymers are graft linked together following the procedures of this invention. Illustrative examples of such sets include the following:

poly-(2,6-dimethyl-1,4-phenylene oxide) graft linked through a polysulfonazide to a polystyrene poly-(2,6-dimethyl-1,4-phenylene oxide) graft linked through a polysulfonazide to a high impact (rubberized) polystyrene polypropylene graft linked through a polysulfonazide to an aromatic polyetherimide polyoctyl acrylate graft linked through a polysulfonazide to a polyamide.

Styrene maleic anhydride graft linked through a polyaryne to a polyazelate.

Aromatic polyester graft linked through a polycarbene to an ethylen propylene diene.

Polystyrene graft linked through polysulfonazide to aromatic polycarbonate which is graft linked through polysulfonazide to a polypropylene.

Polybutylene terephthalate graft linked through polysulfonazide to a polyalkylacrylate.

The amount of additional polymers to which the grafted admixture may be admixed (let-down) is from about 1 to about 99 wt. % of the graft admixture.

What is claimed is:

1. A composition comprising an intimate thermoplastic admixture of at least two structurally dissimilar organic polymers said dissimilar defined as a lack of complete solubility in each other at the concentrations employed and the temperature at which the admixture takes place or at room temperature, a delamination inhibiting effective amount of the first organic polymer covalent bond graft linked to the second organic polymer through the residue of an insertion, electron deficient multifunctional graft linking agent.

2. A composition in accordance with claim 1 wherein the first organic polymer is an aromatic polycarbonate.

3. A composition in accordance with claim 1 wherein the second organic polymer is a polyolefin or a styrenic.

4. A composition in accordance with claim 1 wherein the multifunctional graft linking agent is a polysulfonazide.

5. A composition in accordance with claim 4 wherein the polysulfonazide has two sulfonazide groupings.

6. A composition in accordance with claim 5 wherein the polysulfonazide is an aromatic polysulfonazide.

7. A composition in accordance with claim 4 wherein the composition further includes other nongraft linked organic polymers.

8. A composition in accordance with claim 1 wherein polyphenylene oxide is the first organic polymer.

9. A composition in accordance with claim 1 wherein the first organic polymer has an aromatic group.

10. A composition in accordance with claim 1 wherein the first organic polymer has an olefinic double bond.

11. A composition in accordance with claim 2 wherein the aromatic polycarbonate is derived from bisphenol A.

12. A composition in accordance with claim 11 wherein the second organic polymer is a styrenic polymer or a polyolefin.

13. A composition in accordance with claim 12 wherein the multifunctional graft linking agent is an azide of the formula

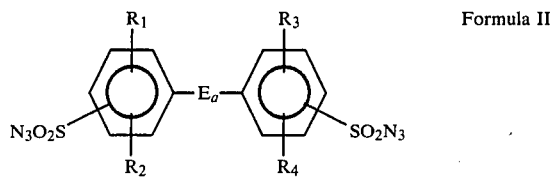

Formula II wherein a is 0 or 1; E is alkylene of one to eight carbon atoms, inclusive; cycloalkylene of one to eight carbon atoms, inclusive; alkylidene of one to eight carbon atoms, inclusive; cycloalkylidene of one to eight carbon atoms, inclusive; oxa; thia; sulfinyl; sulfonyl; carbonyl; N-alkyl wherein alkyl is one to six carbon atoms inclusive; $R_5SiR_6$ wherein $R_5$ and $R_6$ are the same or different and are hydrogen or alkyl of one to six carbon atoms, inclusive; alkylene—$R_7$—alkylene and alkylidene—$R_7$—alkylidene wherein each alkylene and alkylidene are the same or different and are previously defined and $R_7$ is oxa, thia, sulfinyl, sulfonyl, carbonyl, N-alkyl wherein alkyl is as previously defined, phenylene or phenylene substituted with up to two groups the same or different and selected from alkyl of one to six carbon atoms, inclusive, chloro or bromo; $R_1$, $R_2$, $R_3$ and $R_4$ are the same or different and are hydrogen, alkyl of one to six carbon atoms, inclusive; chloro or bromo.

14. A composition in accordance with claim 13 wherein the graft linking agent is 4,4'-biphenyldisulfonyl azide, di-(4-azidosulfonyl)-phenyl ether, or di-(3-azidosulfonyl)phenyl ether.

15. A composition in accordance with claim 14 wherein the agent is 4,4'-biphenyldisulfonyl azide.

16. A composition in accordance with claim 14 wherein the agent is di-(4-azidosulfonyl)-phenyl ether.

17. A composition in accordance with claim 14 wherein the agent is di-(3-azidosulfonyl)phenyl ether.

18. A composition in accordance with claim 4 wherein the first organic polymer is an aromatic polycarbonate.

19. A composition in accordance with claim 18 wherein the second organic polymer to which the aromatic polycarbonate is graft linked is a polyolefin or a styrenic polymer.

20. A composition in accordance with claim 19 wherein the second organic polymer is a polyolefin.

21. A composition in accordance with claim 19 wherein the second organic polymer is a styrenic polymer.

22. A composition in accordance with claim 18 wherein the composition further contains significant quantities of non-graft linked polymer selected from the group consisting of an aromatic polycarbonate a second organic polymer or a mixture of the two.

23. A composition in accordance with claim 22 wherein the significant quantities of non-graft linked aromatic polycarbonate and second organic polymer are not present in the composition when the graft linking reaction occurs.

24. A composition in accordance with claim 18 wherein the composition further contains a third organic polymer, said third organic polymer not graft linked to either of the first two organic polymers.

25. A composition in accordance with claim 24 wherein the third organic polymer is not present in the composition when the graft linking reaction occurs.

26. A composition in accordance with claim 24 wherein the third organic polymer is a styrenic polymer, a polyolefin or an olefin acrylate polymer.

27. A composition in accordance with claim 18 wherein the composition further contains a third organic polymer and a fourth organic polymer dissimilar to the third organic polymer and graft linked to each other through a polysulfonazide.

28. A composition in accordance with claim 19 wherein the composition further contains significant quantities of non-graft linked aromatic polycarbonate, a styrenic polymer, a polyolefin or mixtures thereof.

29. A composition in accordance with claim 28 wherein the non-grafted polymers are not present in the composition when the graft linking occurs.

30. A composition in accordance with claim 19 wherein the composition contains a third organic polymer, said third organic polymer not graft linked to either of the first two organic polymers.

31. A composition in accordance with claim 30 wherein the third organic polymer is not present in the composition when the graft linking reaction occurs.

32. A composition in accordance with claim 30 wherein the composition further contains a fourth organic polymer dissimilar to the third organic polymer and graft linked to each other through a polysulfonazide.

33. A composition in accordance with claim 4 wherein the first organic polymer is a polyphenylene oxide.

34. A composition in accordance with claim 33 wherein the polyphenylene oxide is poly-(2,6-dimethyl-1,4-phenylene oxide).

35. A composition in accordance with claim 34 wherein the second dissimilar organic polymer is an aromatic polycarbonate derived from bisphenol A.

36. A composition in accordance with claim 34 wherein the second dissimilar organic polymer is a polystyrene.

37. A composition in accordance with claim 36 wherein the polystyrene is a high impact polystyrene.

38. A composition in accordance with claim 21 wherein a third organic polymer is present and is an olefin acrylate polymer.

39. A composition in accordance with claim 38 wherein aromatic polycarbonate is at least about eighty weight percent of the composition, the styrenic polymer is from about 5 to 15 wt % of the composition and the olefin acrylate is from about 5 to 15 wt % of the composition.

40. A composition in accordance with claim 39 wherein the styrenic polymer is selectively hydrogenated polystyrene-polybutadiene- polystyrene triblock and the olefin acrylate is ethylene ethyl acrylate.

41. A composition in accordance with claim 40 wherein gasoline resistance of the composition is essentially equivalent to a composition of the same constituents and proportions but without graft linking.

42. A process for preparing an intimate thermoplastic admixture of at least two structurally dissimilar organic polymers said dissimilar defined as a lack of complete solubility in each other at the concentrations employed and the temperature at which the admixture takes place or at room temperature which comprises graft linking one organic polymer to at least a second structurally dissimilar organic polymer with a delamination inhibiting effective amount of a multifunctional grafting agent of the insertion, electron deficient type.

43. A process in accordance with claim 42 wherein one of the graft linked organic polymers is an aromatic polycarbonate.

44. A process in accordance with claim 42 wherein one of the graft linked organic polymers is polyphenylene oxide.

45. A process in accordance with claim 42 wherein one of the graft linked organic polymers is a polyetherimide.

46. A process in accordance with claim 42 wherein one of the graft linked organic polymers has an aromatic group.

47. A process in accordance with claim 43 wherein the structurally dissimilar organic polymer is a polyolefin or a styrenic polymer.

48. A process in accordance with claim 43 wherein the aromatic polycarbonate is derived from bisphenol A.

49. A process in accordance with claim 48 wherein the dissimilar organic polymer is a polyolefin or a styrenic.

50. A process in accordance with claim 43 wherein the multifunctional graft linking agent is a polysulfonazide.

51. A process in accordance with claim 50 wherein the polysulfonazide is of the formula

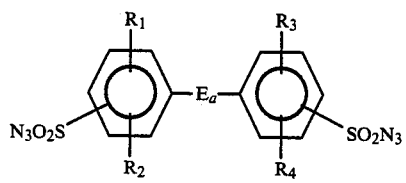

Formula II wherein a is 0 or 1; E is alkylene of one to eight carbon atoms, inclusive; cycloalkylene of one to eight carbon atoms, inclusive; alkylidene of one to eight carbon atoms, inclusive; cycloalkylidene of one to eight carbon atoms, inclusive; oxa; thia; sulfinyl; sulfonyl; carbonyl; N-alkyl wherein alkyl is one to six carbon atoms inclusive; $R_5SiR_6$ wherein $R_5$ and $R_6$ are the same or different and are hydrogen or alkyl of one to six carbon atoms, inclusive; alkylene—$R_7$—alkylene and alkylidene—$R_7$—alkylidene wherein each alkylene and alkylidene are the same or different and are previously defined and $R_8$ is oxa, thia, sulfinyl, sulfonyl, carbonyl, N-alkyl wherein alkyl is as previously defined, phenylene or phenylene substituted with up to two groups the same or different and selected from alkyl of one to six carbon atoms, inclusive, chloro or bromo;

$R_1$, $R_2$, $R_3$ and $R_4$ are the same or different and are hydrogen, alkyl of one to six carbon atoms, inclusive; chloro or bromo.

52. A process in accordance with claim 51 wherein the grafting agent is from about 0.1 to about 1.5 wt. percent of the organic polymers.

53. A process in accordance with claim 52 wherein the polysulfonazide is 4,4'-bi-phenyldisulfonyl azide.

54. A process in accordance with claim 51 wherein the polysulfonazide is di-(4-azidosulfonyl)-phenyl ether.

55. A process in accordance with claim 51 wherein the polysulfonazide is di-(3-azidosulfonyl)phenyl ether.

56. A shaped article molded from the composition of claim 1.

57. A composition comprising an intimate thermoplastic admixture of at least two structurally dissimilar organic polymers said dissimilar defined as a lack of complete solubility in each other at the concentrations employed and the temperature at which the admixture takes place or at room temperature covalent bond graft linked to each other through the residue of an insertion, electron deficient multifunctional graft linking agent.

58. A process for preparing an intimate thermoplastic admixture which comprises graft linking one organic polymer to structurally dissimilar organic polymer said dissimilar defined as a lack of complete solubility in each other at the concentrations employed and the temperature at which the admixture takes place or at room temperature by reacting with an insertion, electron deficient multifunctional graft linking agent.

59. A process in accordance with claim 42 wherein the thermoplastic admixture is further admixed with additional non-grafted first organic polymer.

60. A process in accordance with claim 42 wherein the thermoplastic admixture is further admixed with additional non-grafted second structurally dissimilar organic polymer.

61. A process in accordance with claim 42 wherein the thermoplastic admixture is further admixed with additional non-grafted first and second organic polymer.

62. A process in accordance with claim 42 wherein the thermoplastic admixture is further admixed with a non-grafted third polymer.

63. A process in accordance with claim 59 wherein the final admixture obtained has inhibited delamination.

64. A process in accordance with claim 60 wherein the final admixture obtained has inhibited delamination.

65. A process in accordance with claim 61 wherein the final admixture obtained has inhibited delamination.

66. A process in accordance with claim 62 wherein the final admixture obtained has inhibited delamination.

67. A composition in accordance with claim 1 wherein the first organic polymer is a polyetherimide.

68. A composition in accordance with claim 1 wherein the first organic polymer is a polybutylene terephthalate.

* * * * *